United States Patent
Tanaka et al.

(10) Patent No.: US 10,659,747 B1
(45) Date of Patent: May 19, 2020

(54) VIDEO DISPLAY DEVICE

(71) Applicant: MAXELL, LTD., Kyoto (JP)

(72) Inventors: Kazuhiko Tanaka, Tokyo (JP); Mitsuo Nakajima, Tokyo (JP); Nobuhiro Fukuda, Tokyo (JP); Haruhiko Higuchi, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/493,234

(22) PCT Filed: Mar. 15, 2017

(86) PCT No.: PCT/JP2017/010539
§ 371 (c)(1),
(2) Date: Sep. 11, 2019

(87) PCT Pub. No.: WO2018/167898
PCT Pub. Date: Sep. 20, 2018

(51) Int. Cl.
*G09G 5/00* (2006.01)
*H04N 9/77* (2006.01)
*G09G 3/20* (2006.01)

(52) U.S. Cl.
CPC .............. *H04N 9/77* (2013.01); *G09G 3/20* (2013.01); *G09G 3/2003* (2013.01); *G09G 2320/0666* (2013.01)

(58) Field of Classification Search
CPC ............... G09G 3/2003; G09G 3/20; G09G 2320/0233; G09G 2320/0666; G09G 2360/14
See application file for complete search history.

(56) References Cited

U.S. PATENT DOCUMENTS

| | | | |
|---|---|---|---|
| 8,180,172 B2 * | 5/2012 | Kuno | G06T 5/40 382/162 |
| 8,831,372 B2 * | 9/2014 | Akiyama | G06T 5/002 382/261 |
| 2008/0002905 A1 | 1/2008 | Kuno | |

(Continued)

FOREIGN PATENT DOCUMENTS

| | | |
|---|---|---|
| JP | 2000-278528 A | 10/2000 |
| JP | 2005-004506 A | 1/2005 |

OTHER PUBLICATIONS

International Search Report issued in corresponding International Patent Application No. PCT/JP2017/010539, dated May 23, 2017, with English translation.

(Continued)

*Primary Examiner* — Vijay Shankar
(74) *Attorney, Agent, or Firm* — McDermott Will & Emery LLP

(57) ABSTRACT

An object is to obtain a visibility-improved video while more favorably maintaining a color rendering property in a video display device. To achieve the object, a video input unit, a video correcting unit that performs video correction on a video input by the video input unit, and a video display unit that displays the video corrected by the video correcting unit are included, and the video correcting unit is configured to perform local luminance correction on the video input by the video input unit, acquire a correction intensity for each part of the local luminance correction, and perform local saturation correction based on the correction intensity.

10 Claims, 14 Drawing Sheets

(56) References Cited

U.S. PATENT DOCUMENTS

2012/0093432 A1* 4/2012 Akiyama ............... G06T 5/002
   382/260
2016/0307489 A1 10/2016 Nakajima et al.

OTHER PUBLICATIONS

Yoshihiro Nozato, et al., "Comparison of Retinex Models for Hardware Implementation," (Comparison Evaluation of Retinex theory in achieving Hardware of Adaptive Gradation Correction), The Institute of Electronics, Information and Communication Engineers, IEICE Technical Report, SIS2005-16, (Jun. 2005), pp. 19-24, with English abstract.
Daniel J. Jobson, et al., "Properties of a Center/Surround Retinex: Part 2—Surround Design," NASA Technical Memorandum 110188, Aug. 1995, pp. 1-13.
Zia-ur Rahman, et al., "Multi-Scale Retinex For Color Image Enhancement," ICIP, IEEE, 1996, pp. 1003-1006.

* cited by examiner

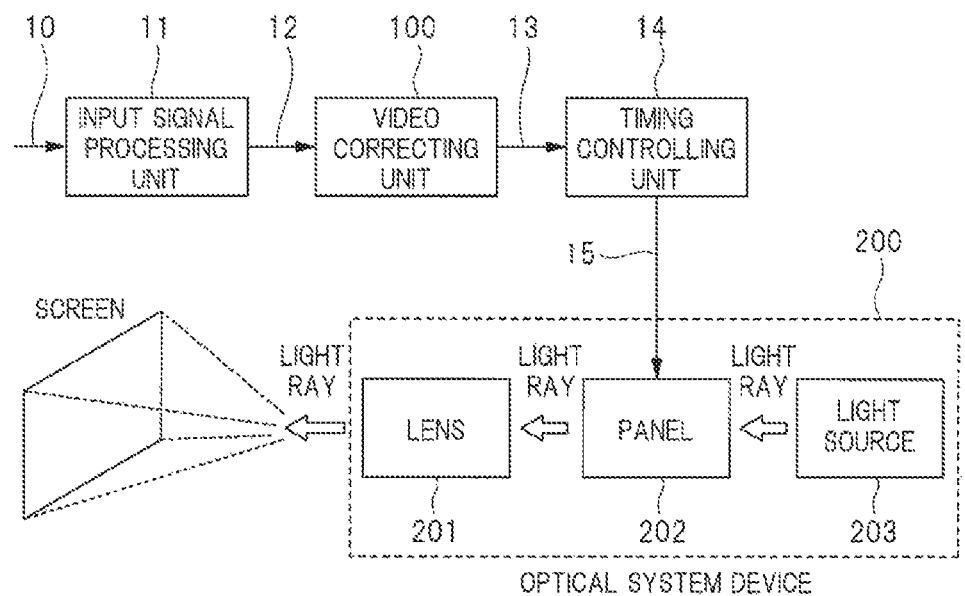
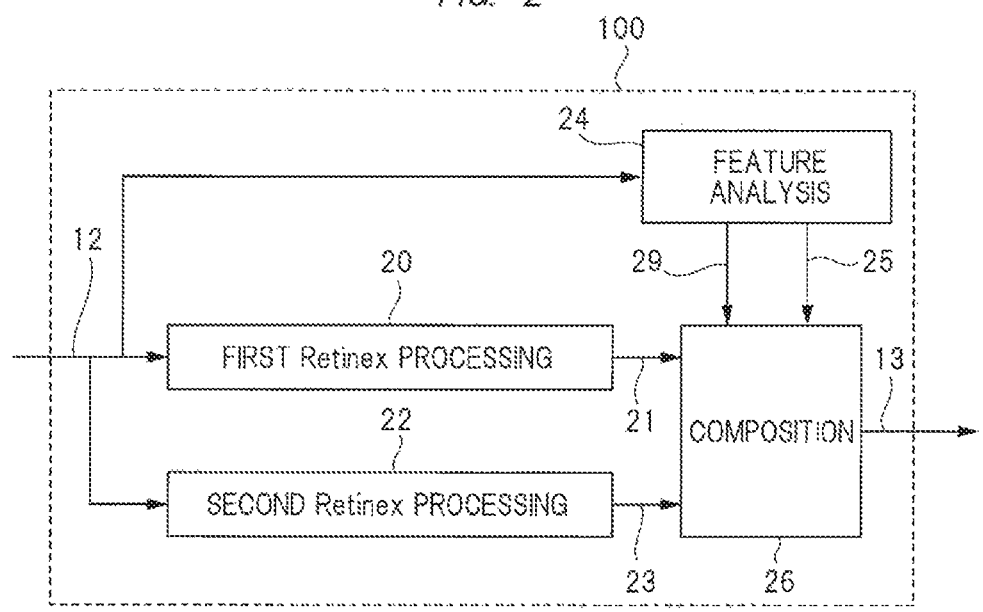

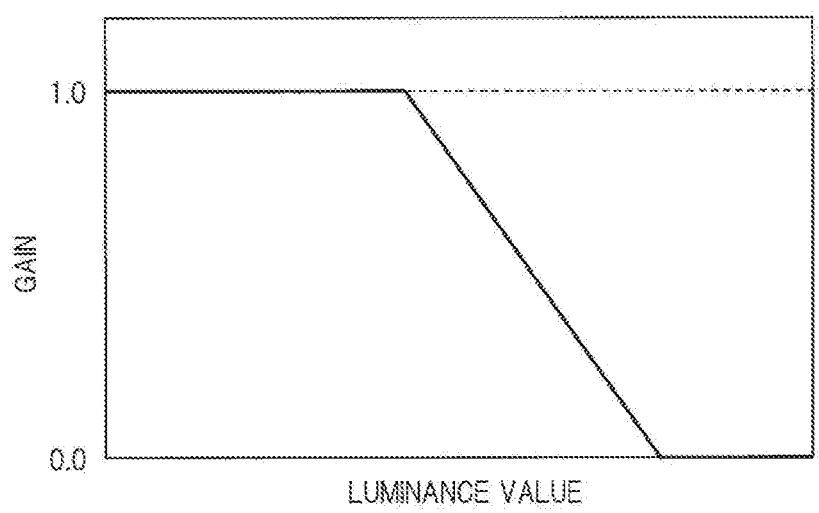

VIDEO DISPLAY DEVICE

CROSS-REFERENCE OF RELATED APPLICATIONS

This application is the U.S. National Phase under 35 U.S.C. § 371 of International Patent Application No. PCT/JP2017/010539, filed on Mar. 15, 2017, the entire disclosure of which Application is incorporated by reference herein.

TECHNICAL FIELD

The present invention relates to a video processing technique.

BACKGROUND ART

As a background technique of the present technical field, Patent Document 1 is cited. In the publication, in a Multi Scale Retinex (MSR) process, a composite blur image is created by selecting any one of a plurality of blur images which are generated from a plurality of peripheral functions different scales and which are different in a degree of the blur for each pixel in accordance with a pixel value level of an original image to be a processing target. It is described that the composite blur image is subjected to low pass filter, so that the Retinex process is performed while occurrence of unnatural discontinuation in a boundary is prevented.

PRIOR ART DOCUMENT

Patent Document

Patent Document 1: Japanese Patent Application Laid-Open Publication No. 2005-004506

SUMMARY OF THE INVENTION

Problems to be Solved by the Invention

As a parameter indicating a property of an object captured in video signals, there are various parameters such as a luminance, a color, and a frequency component, and these values are different from each other when video scenes are different from each other. In order to display the video with a good visibility, it is required to correct the video by changing a property such as a contrast correction of the video in accordance with a feature of the video.

However, in such a technique of adjusting a plurality of scales and achieving high performance of a dynamic range compression in an MSR as disclosed in Patent Document 1, contribution of the video to the plurality of scales is considered while the feature of the object is not considered. Therefore, the correction is uniformly performed regardless of the feature of the object in the video. In addition, a contribution of the video to difference in a reflection property is not considered.

In view of the background art and the problems, an object of the present invention is to provide a video display device more preferably improving the definition of the video and the visibility of the shadow portion.

Means for Solving the Problems

To cite an example, the present invention includes a video input unit, a video correcting unit that performs video correction on a video input by the video input unit, and a video display unit that displays the video corrected by the video correcting unit, and the video correcting unit is configured to perform local luminance correction on the video input by the video input unit, acquire a correction intensity for each part of the local luminance correction, and perform local saturation correction based on the correction intensity.

Effects of the Invention

According to the present invention, it is possible to provide a video display device capable of obtaining a video having more appropriately improved visibility.

BRIEF DESCRIPTION OF THE DRAWINGS

FIG. 1 is a diagram of a configuration example of a video display device according to a first embodiment of the present invention;

FIG. 2 is a diagram of a configuration example of a video correcting unit;

FIG. 12B is a diagram for describing a diffusion correction gain based on a luminance value of a video;

BEST MODE FOR CARRYING OUT THE INVENTION

Figure 3:
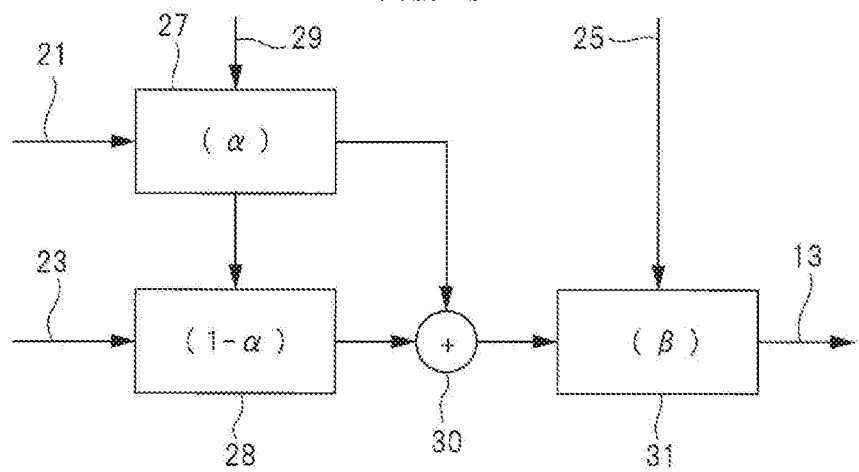
FIG. 3 is a diagram of a configuration example of a video composition unit.

Hereinafter, embodiments of the present invention will be described based on the accompanying drawings. However, the present invention is not always limited to these embodiments. Note that the same components are denoted by the same reference symbols throughout each drawing for describing the embodiments, and the repetitive description thereof will be omitted.

First Embodiment

In the present embodiment, a video display device which corrects a video by video decomposition for each light reflection property will be described by using a configuration of a projector. Note that the following will be explanation in a case of a front projector. However, a rear projection television may be applied as another example. In addition, without performing a magnification projection of a panel, a display device using a direct-vision flat display such as a liquid crystal display, a plasma display, or an organic EL display may be applied. This viewpoint is also the same in any of the following embodiments.

FIG. 1 is an example of a configuration diagram of the video display device of the present embodiment.

The present video display device has a configuration including: an input signal processing unit 11 which receives a video input signal 10 as an input and which converts the video input signal into an internal video signal 12 by, for example, a decoder, an IP conversion, a scalar, and others for a compressed video signal; a video correcting unit 100 which receives the internal video signal 12 as an input; a timing controlling unit 14 which receives a correction video signal 13 as an input and which generates a display control signal 15 based on horizontal/vertical synchronization signals of a display screen of the correction video signal; and an optical-system device 200 which displays a video.

The optical-system device 200 has a configuration including: an optical source 203 which emits a light ray for projecting the video to the screen; a panel 202 which receives the display control signal 15 as an input, which adjusts gradation of the light ray from the optical source 203 for each pixel, and which creates a projection video; and a lens 201 which is used for the magnification projection of the projection video onto the screen.

When the video display device is a direct-vision flat display such as a liquid crystal display, a plasma display, or an organic EL display, note that the lens 201 of the optical-system device 200 is not required. A user directly views the panel 202.

An example of a configuration of the video correcting unit 100 is illustrated in FIG. 2. A first Retinex processing unit 20 and a second Retinex processing unit 22 perform a video processing on the internal video signal 12 based on a Retinex theory, and output a first correction video signal 21 and a second correction video signal 23.

Here, the Retinex theory is a theory on a visual property of human eyes such as color constancy and brightness constancy. By the theory, an illumination light component can be separated from the video, and a reflected light component can be extracted.

Therefore, in a video correction process based on the Retinex theory, a high visibility video can be obtained even for a video in a dark room or under a bright backlight by removing an influence of the illumination light component being a cause by which an object such as a person in the video is difficult to be viewed and by extracting the reflected light component. Accordingly, a dynamic range which a human can naturally see and feel can be appropriately compressed even in a digital gradation.

The Retinex theory has a lot of models based on estimation methods of the illumination light component or the reflected light component. For example, in the following Reference Document 1, the models of McCann 99, PSEUDO, Poisson, and QP are compared.

In addition, a Retinex for extracting the reflected light component under estimation of a local illumination light component so as to follow a Gaussian distribution is called as a Center/Surround (hereinafter, referred to as C/S) Retinex. The models represented by the Retinex include a Single Scale Retinex model (hereinafter, SSR), a Multiscale Retinex model (hereinafter, referred to as MSR), and others.

The SSR is a model in which a luminance component of the reflected light with respect to one scale is extracted from the video (for example, see the following Reference Document 2), and the MSR is a model in which the SSR is expended and a luminance component of the reflected light with respect to a plurality of scales is extracted from the video (for example, see the Reference Document 3).

[Reference Document 1] "Comparison of Retinex Models for Hardware Implementation (Comparison Evaluation of Retinex theory in achieving Hardware of Adaptive Gradation Correction)", Yoshihiro NOZATO and others, Shingaku Technical Report, SIS2005-16, (2005).

[Reference document 2] D. J. Jobson and G. A. Woodell, Properties of a Center/Surround Retinex: Part 2. Surround Design, NASA Technical Memorandum, 110188, 1995.

[Reference document 3] Zia-ur Rahman, Daniel J. Jobson, and Glenn A. Woodell, "Multiscale Retinex For Color Image Enhancement", ICIP '96

In the present embodiment, as an example, the first Retinex processing unit 20 is assumed to use the McCann 99 model excellent in illumination light estimation performance, and the second Retinex processing unit 22 is assumed to use the MSR model excellent in contrast correction performance. A feature analyzing unit 24 analyzes a feature of the internal video signal 12, and outputs a first video composing control signal 29 and a second video composing control signal 25 to a video composing unit 26. The video composing unit 26 composes the correction video signal 21 and the correction video signal 23 based on the first video composing control signal 29 and the second video composing control signal 25, and outputs the correction video signal 13.

FIG. 3 illustrates an example of a configuration of the video composing unit 26. The correction video signal 21 is magnified by "a" in a gain controlling unit 27, the correction video signal 23 is magnified by "(1-α)" in a gain controlling unit 28, and the both signals are subjected to an addition process in an adder 30, and then, are magnified by "3" in a gain controlling unit 31, so that the correction video signal 13 is obtained.

Next, an example of an operation of the configuration illustrated in FIGS. 1 to 3 will be described by using FIGS. 4A to C and FIGS. 5A to F.

First, a control by the first video composing control signal 29 in the present embodiment will be described.

Figure 4A:
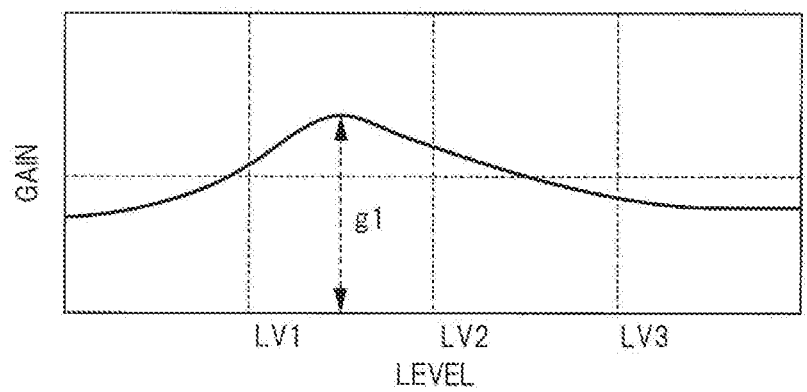
FIG. 4A is an example of a property of a first Retinex processing unit.
Figure 4B:
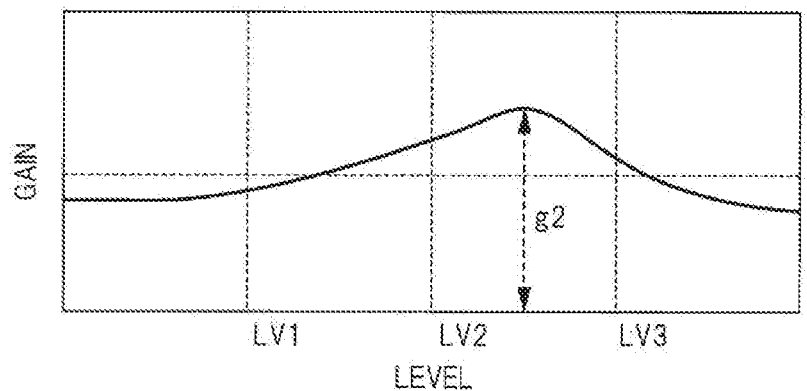
FIG. 4B is an example of a property of a second Retinex processing unit.

In FIGS. 4A and 4B, the horizontal axis represents a luminance level, the vertical axis represents a gain, and each of them shows an example of the gain property for the luminance levels of the first Retinex processing unit 20 and the second Retinex processing unit 22. In the present embodiment, the drawings illustrate an example of a case of usage of the McCann 99 model for the first Retinex processing unit 20 and usage of the MSR model for the second Retinex processing unit 22. In the example of FIG. 4A, the first Retinex processing unit 20 based on the McCann 99 model has a gain peak "g1" between luminance levels LV1 and LV2. In the example of FIG. 4B, the second Retinex processing unit 22 using the MSR model has a gain peak "g2" between LV2 and LV3.

Figure 4C:
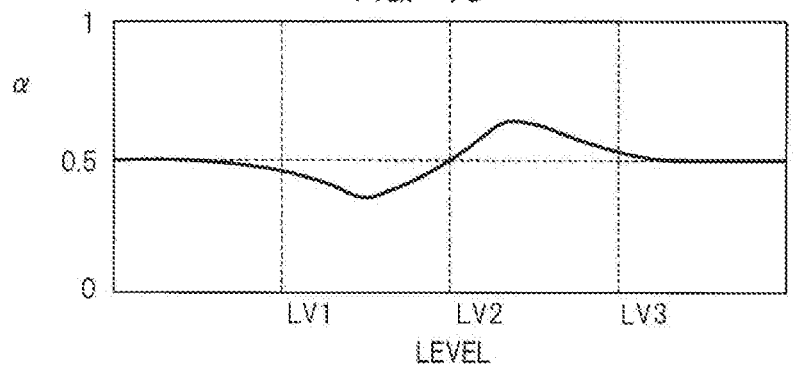
FIG. 4C is an example of a property of a video composition controlling signal.

FIG. 4C is a diagram illustrating an example of a composition control value "a" based on the first video composing control signal 29 outputted from the feature analyzing unit 24 illustrated in FIG. 2 in a case that the properties of the first Retinex processing unit 20 and the second Retinex processing unit 22 are as illustrated in the above-described FIGS. 4A and 4B. As illustrated in FIG. 4C, a configuration control value is controlled so that the composition control value α is decreased at a luminance level at which the gain of the first Retinex processing unit 20 is higher than the gain of the second Retinex processing unit 22, and, on the contrary, the composition control value α is increased at a luminance level at which the gain of the first Retinex processing unit 20 is lower than the gain of the second Retinex processing unit 22. In this manner, input/output properties of the composition output video of the first Retinex processing unit 20 and the second Retinex processing unit 22 which is outputted from the adder 30 have a linear property.

By the process described above, it is possible to obtain a composition video having both advantages of the Retinex processing based on the McCann 99 model excellent in the illumination light estimation performance and the Retinex processing based on the MSR model excellent in contrast correction performance.

Next, a control by using the second video composing control signal 25 in the present embodiment will be described.

Figure 5A:
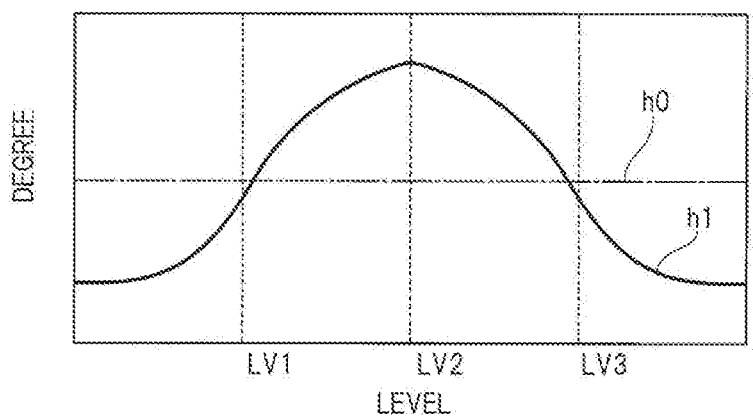
FIG. 5A is an example of luminance histogram of a video.
Figure 5B:
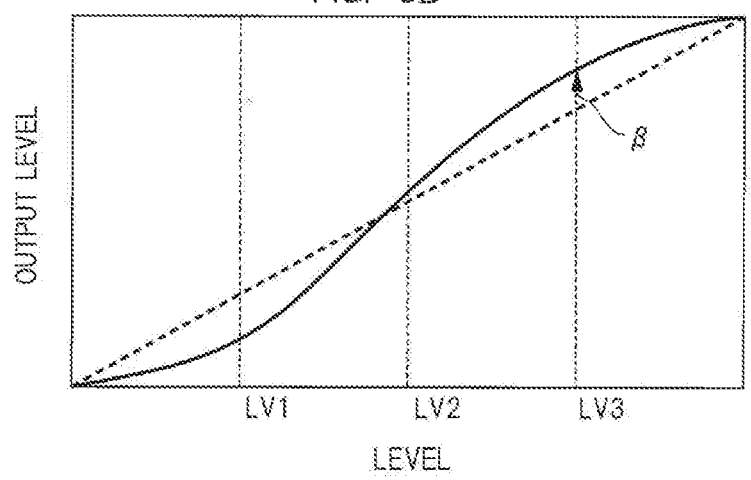
FIG. 5B is an example of an input/output property of a video.

FIGS. 5A and 5B illustrate an example of a control of the second video composing control signal 25 outputted from the feature analyzing unit 24.

First, in FIG. 5A, the horizontal axis represents a luminance level of a video, the vertical axis represents the number of pixels in one screen, and distribution of each luminance level is graphed as a histogram graph. In the example of FIG. 5A, a histogram h1 shows that the distribution in a range from the luminance level LV1 to the luminance level LV3 is larger than the distribution of the luminance level from the luminance level LV1 or lower and from the luminance level LV3 or higher. When the distribution in the range from the luminance level LV1 to the luminance level LV3 is flat, note that the distribution becomes a histogram h0 illustrated by a chain line.

In FIG. 5B, the horizontal axis represents a luminance level of an input video, the vertical axis represents a luminance level of an output video, and an example of the second video composing control signal 25 outputted from the feature analyzing unit 24 when the above-described luminance distribution of FIG. 5A is as the histogram h1. This drawing illustrates an input/output level property controlled by a gain control value β. When the luminance distribution of FIG. 5A is as the histogram h0, the input/output level property becomes the property illustrated by a dotted line of FIG. 5B.

When the luminance distribution of FIG. 5A is as the histogram h1, the input/output level property becomes the property illustrated by a solid line of FIG. 5B. Here, an item β takes the linear property illustrated by a dotted line as a reference value (β=1). The property as illustrated by the solid line of FIG. 5B is obtained by varying the gain control value β0 in accordance with an input level. In the example of FIG. 5B, the gain control value β is 1 at LV2, but becomes a value smaller than 1 at LV1, and becomes a value larger than 1 at LV3. As described above, in the case of the histogram h1 of FIG. 5A, the input/output property curve in the range from LV1 to LV3 having the large luminance distribution is controlled by the gain control value β so as to be steep as compared with a slope in other range. By obtaining the correction video signal 13 in such a property, more output luminance levels are assigned to an area having a large distribution in the video, and therefore, a video having a good visibility can be obtained.

FIGS. 5C to 5F are diagrams for describing an example of the control performed when the luminance distribution is different from FIG. 5A.

Figure 5C:
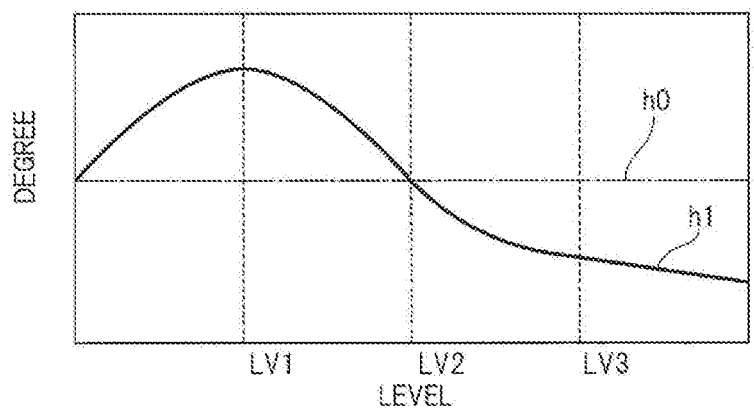
FIG. 5C is an example of luminance histogram of a video.
Figure 5D:
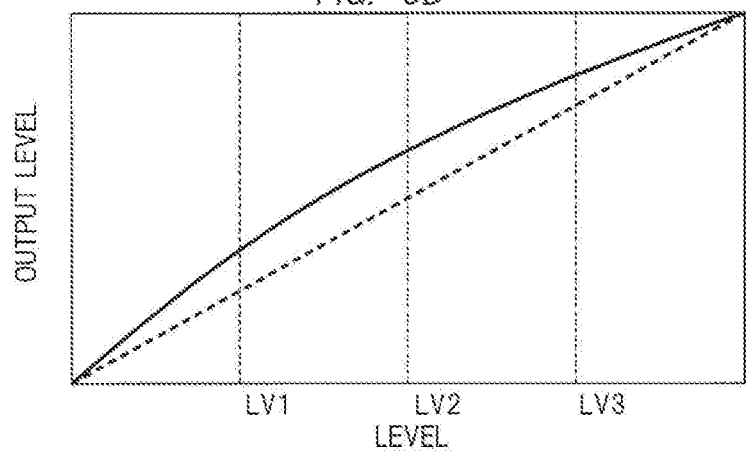
FIG. 5D is an example of an input/output property of a video.

First, FIG. 5C illustrates an example of a histogram obtained when the luminance distribution at the luminance level LV2 or lower is larger than that at the luminance level LV2 or higher. An example of the gain control value β in this case is illustrated in FIG. 5D. As illustrated in FIG. 5D, the slope of the property curve at the LV2 or lower having the large luminance distribution is controlled so as to be steep as compared to that at the luminance level LV2 or higher, so that more output luminance levels are assigned to a luminance band having the large video distribution. In this manner, a video having a good visibility can be obtained.

Figure 5E:
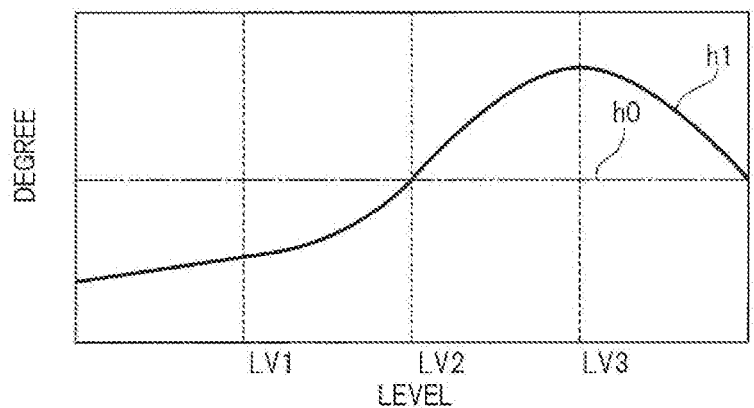
FIG. 5E is an example of luminance histogram of a video.
Figure 5F:
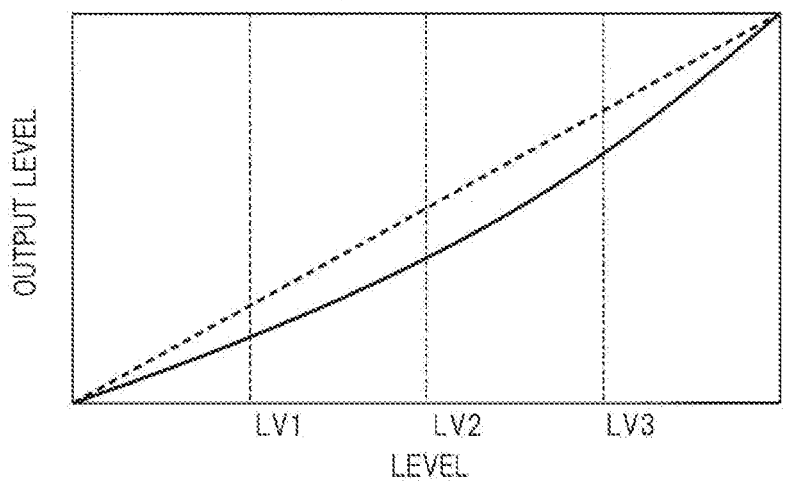
FIG. 5F is an example of an input/output property of a video.

Next, FIG. 5E illustrates an example of a histogram obtained when the luminance distribution at the luminance level LV2 or higher is larger than that at the luminance level LV2 or lower. An example of the gain control value β in this case is illustrated in FIG. 5F. As illustrated in FIG. 5F, the slope of the property curve at the LV2 or more when the luminance distribution is large is controlled to be steep as compared to the luminance level LV2 or lower, so that more output luminance levels are assigned to a luminance band having the large video distribution. Therefore, it a video having a good visibility can be obtained.

By a series of control of the video composing unit 26 described above, it is possible to obtain a video having a good visibility while taking both advantages of the Retinex processing based on the McCann 99 model excellent in illumination light estimation performance and the Retinex processing based on the MSR model excellent in contrast correction performance.

In the above description, note that a combination of the Retinex models is not limited to the above-described examples, but may be a combination of Retinex models of different methods. In addition, the combination is not limited to the combination of two models, but may be a combination of three or more models. In this case, the plurality of Retinex processing units illustrated in FIG. 2 may be configured to be arranged in parallel to compose the corrected video of each Retinex processing unit by the composition processing unit 26 so as to obtain the correction video signal 13.

Second Embodiment

A second embodiment is an example which is different from the first embodiment in the operation of the video correcting unit 100 in the video display device of FIG. 1. The following is explanation for the difference from the first embodiment. Particularly, apart without the explanation is the same as that of the first embodiment, and therefore, the explanation will be omitted.

The video correcting unit 100 of the second embodiment will be described by using FIG. 2. The first Retinex processing unit 20 and the second Retinex processing unit 22 perform the video processing on the internal video signal 12 based on the Retinex theories having different methods, and output the correction video signal 21 and the correction video signal 23. In the present embodiment, it is assumed that the second Retinex processing unit 22 performs a large scale of Retinex processing than that of the first Retinex processing unit 20. Here, the scale of the Retinex processing is a size of a pixel range which is referred to in the Retinex processing.

The feature analyzing unit 24 analyzes a feature of the internal video signal 12, and outputs the first video composing control signal 29 and the second video composing control signal 25 to the video composing unit 26. The video composing unit 26 composes the correction video signal 21 and the correction video signal 23 based on the video composing control signal 29 and the video composing control signal 25, and outputs the correction video signal 13.

Here, the second video composing control signal 25 and the gain control value β of the second embodiment are the same as those of the first embodiment, and thus the description thereof will be omitted.

The gain control value α by the first video composing control signal 29 of the second embodiment is different from that of the first embodiment. The following is its explanation.

Figure 6:
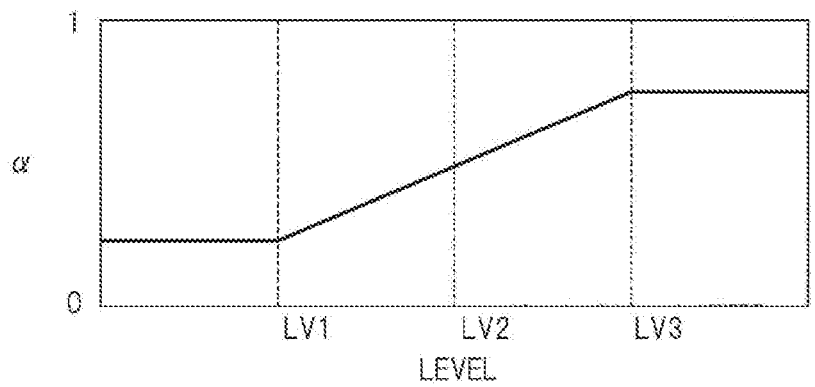
FIG. 6 is a diagram of an operational property of a feature analyzing unit according to a second embodiment of the present invention.

FIG. 6 illustrates an example of the output property of the first video composing control signal in the feature analyzing unit 24 according to the second embodiment. In FIG. 6, the horizontal axis represents a luminance level of a video, and the vertical axis represents a value of the first video composing control signal 29. As illustrated in FIG. 6, for example, a becomes small when the luminance level is low, and a becomes large when the luminance level is high. By controlling the a as described above, a composition ratio can be changed in accordance with the luminance level. When the luminance level is small in the correction video signal 13 obtained by the video composing unit 26, a ratio of the second Retinex processing unit 22 can be increased. In addition, when the luminance level is large, a ratio of the first Retinex processing unit 20 can be increased. That is, a component from the first Retinex processing unit 20 having a small scale of the Retinex processing includes a lot of reflected light components having a relatively high frequency component. Therefore, by increasing the composition ratio in a video area having a high luminance, the definition of the video can be increased. In addition, a component of the second Retinex processing unit 22 having a large scale of the Retinex processing includes a lot of reflected light components having a relatively low frequency component. Therefore, by increasing the composition ratio in a video area having a low luminance, the visibility of a shadow portion of the video can be increased. Note that the property illustrated in FIG. 6 is an example, and the maximum value, the minimum value, the slope, and others at each luminance level may be determined in accordance with the property of the Retinex processing.

In the embodiment described above, the example of generation by the video composing control signal 29 in accordance with the luminance level of the video has been described. However, the control in accordance with a frequency component may be adopted. As the case of the control in accordance with the frequency component, in a case of the high frequency component for each area of the video signal, the ratio of the video signal obtained from the Retinex processing unit having a small scale size is increased in the correction video signal 13. In a case of the low frequency component for each area of the video signal, the ratio of the video signal obtained from the Retinex processing unit having a large scale size is increased in the correction video signal 13. Furthermore, the composition control using both the luminance level and the frequency component of the video may be performed. In this case, for example, the control may be performed by the above-described control value in accordance with the luminance level and a normalization value obtained by additional or product calculation of the control value in accordance with the frequency component.

According to the second embodiment of the present invention described above, both of the definition of the video and the visibility of the shadow portion can be achieved by composing the corrected videos of the plurality of different Retinex processing in accordance with the scale of the Retinex processing.

Third Embodiment

Figure 7:
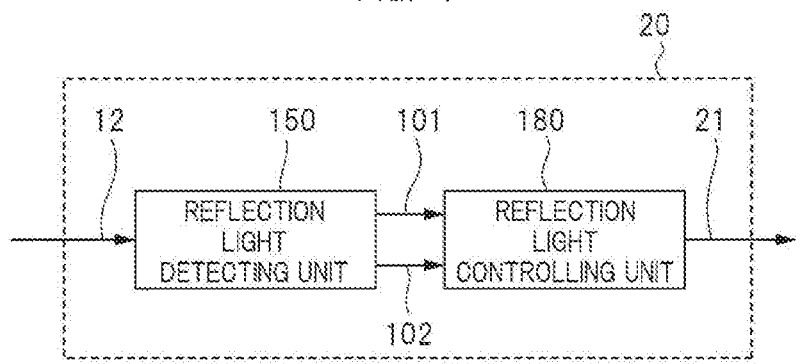
FIG. 7 is an example of a configuration of a Retinex processing unit according to a third embodiment of the present invention.

Next, the description will be made about an embodiment when a different Retinex model is used in the video correcting unit 100 in the video display device illustrated in FIG. 1. As the configuration of the video correcting unit 100, the configuration of FIG. 2 is used as an example. However, the configuration is not limited thereto. FIG. 7 illustrates a configuration example of the first Retinex processing unit 20 including: a reflected light detection unit 150 which receives the internal video signal 12 as an input signal and detects two reflected light components 101 and 102 through the video processing based on the Retinex theory; and a reflected light control unit 180 which receives the detected two reflected light components as inputs, which adjusts the reflected light, and then which outputs the correction video signal 13 through the recomposition.

Next, the reflected light detection unit 150 and the reflected light control unit 180 will be described.

In accordance with a nature of an object, the reflection of light is classified into, for example, light (hereinafter, referred to as a specular component) reflected as specular reflection on such a smooth surface as a mirror, light (hereinafter, referred to as a diffusing component) reflected as diffuse reflection by small asperity on a rough surface, and ambient light (hereinafter, referred to as an ambient component) scattered by being repeatedly reflected on the peripheral environment.

For example, in a three-dimensional computer graphic field, there is a Phong reflection model as a reflection model expressing the shadow of the surface of the object by using such natures of three types of light. According to the Phong reflection model, the material can be expressed by a magnitude of the reflection of the light.

For example, when a spot light is emitted to a plastic spherical object, a small circular highlight having a high luminance is formed. In addition, in a rubber spherical object, a radius of the highlight is wider but the luminance is lower than those of the plastic spherical object. The highlight portion is the specular component. In addition, also in the diffusing component and the ambient component, the luminance is different in accordance with the material.

Figure 10:
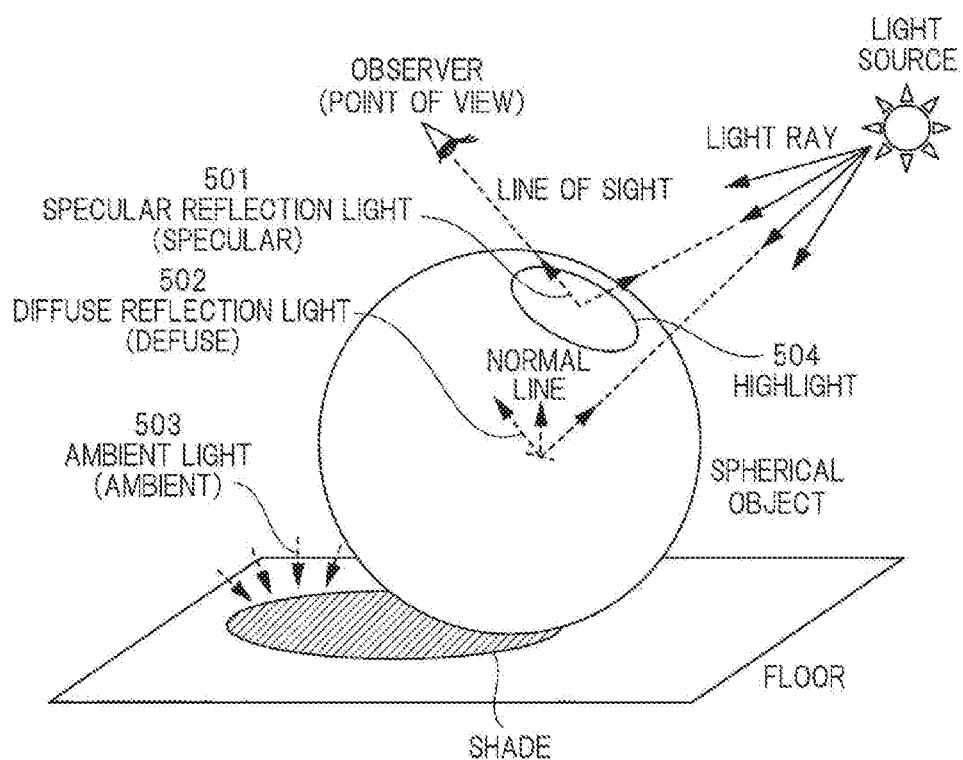
FIG. 10 is a diagram for describing a property of the reflected light according to a Phong reflection model.

FIG. 10 is a diagram for describing an example of the Phong reflection model. The drawing includes an optical source, light ray extending from the optical source, a spherical object which the light ray reaches, a floor on which the spherical object is placed, and an observer who observes the scene. The observation is performed at a position of the viewpoint, and may be performed by actual observation through eyes, and may use an observation machine such as a camera.

The specular component in FIG. 10 is light 501 obtained by reflection of a light ray on the surface of the spherical object in a line-of-sight direction. The component is formed by the reflection of the light ray on the spherical object, and a circular highlight 504 in the drawing is a region of the specular component. For example, in the case of the plastic spherical object, a small circular highlight having a high luminance is formed. In addition, in the case of the rubber spherical object, the radius of the highlight is wider and the luminance is lower than those of the plastic one. In the Phong reflection model, it is assumed that the specular component follows the power of cosine between the line of sight and the reflected light.

The diffusing component in FIG. 10 is the diffused reflection light of light 502 obtained by the hitting of the light ray onto the spherical object. The luminance of the diffusing component is determined by direction of the light ray and the spherical object, that is, by cosine between the light ray and a normal line, and therefore, a portion of the spherical object on which the light directly hits becomes a region of the diffusing component.

The ambient component in FIG. 10 is light 503 which goes around the shadow portion. The component is the light which is the scattered light reflected on the peripheral environment several times, averaged by the peripheral environment, and left. Therefore, even the shadow portion which the light does not directly reach has a constant luminance. The brightness of the diffused reflection light forming the shadow is determined by cosine between the light ray and the direction of the surface of the spherical object, that is, cosine between a vector of the light ray and a normal line.

From the above description, the Phong reflection model is shown as the following Expression.

$$I = k_d \sum_{i=1}^{l} (\vec{N} \cdot \vec{L}) m_d + k_g \sum_{i=1}^{l} (\vec{R} \cdot \vec{V})^n I_j + I_a \quad \text{[Mathematical Expression 1]}$$

Accordingly, the reflected light in the reflected light detection unit according to the present embodiment is assumed to include the ambient component, the diffusing component, and the specular component, and it is assumed that the ambient component in the video follows a Gaussian distribution having a wide scale, the diffusing component follows a luminance distribution based on cosine, and the specular component follows a luminance distribution based on the power of cosine. When it is assumed that a filter of the ambient component is set to Fa(x, y), a filter of the diffusing component is set to Fd(x, y), and a filter of the specular component is set to Fs(x, y), each filter is as the following Expressions.

$$F_a(x, y) = \frac{1}{\sqrt{2\pi}\,\sigma} e^{-\frac{x^2+y^2}{2\sigma^2}} \quad \text{[Mathematical Expression 2]}$$

$$F_d(x, y) = \cos\left(\frac{\pi\sqrt{x^2+y^2}}{k}\right)/N \quad \text{[Mathematical Expression 3]}$$

$$F_g(x, y) = \cos^n\left(\frac{\pi\sqrt{x^2+y^2}}{k}\right)/N^n \quad \text{[Mathematical Expression 4]}$$

Figure 11A:
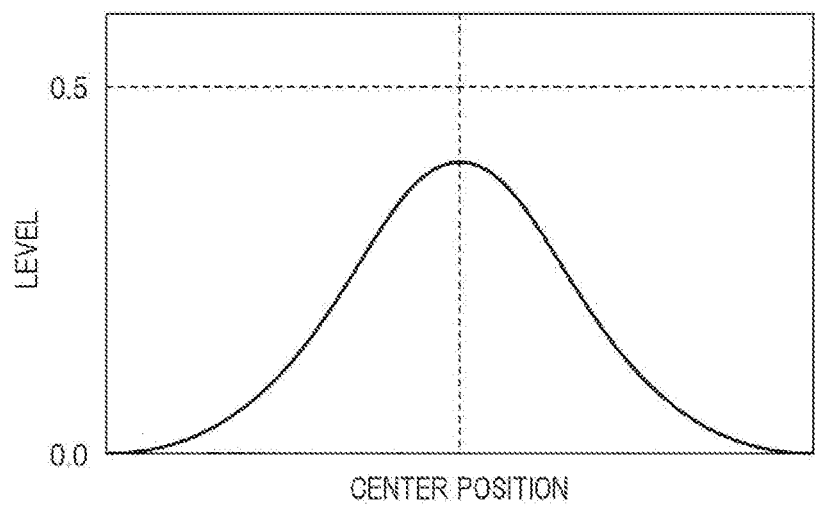
FIG. 11A is a diagram for describing a Gaussian distribution.
Figure 11B:
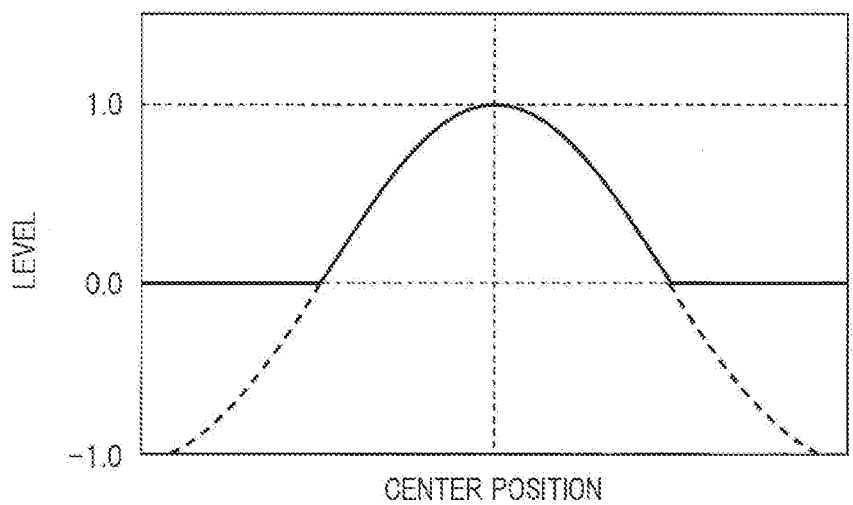
FIG. 11B is a diagram for describing a luminance distribution based on a cosine.
Figure 11C:
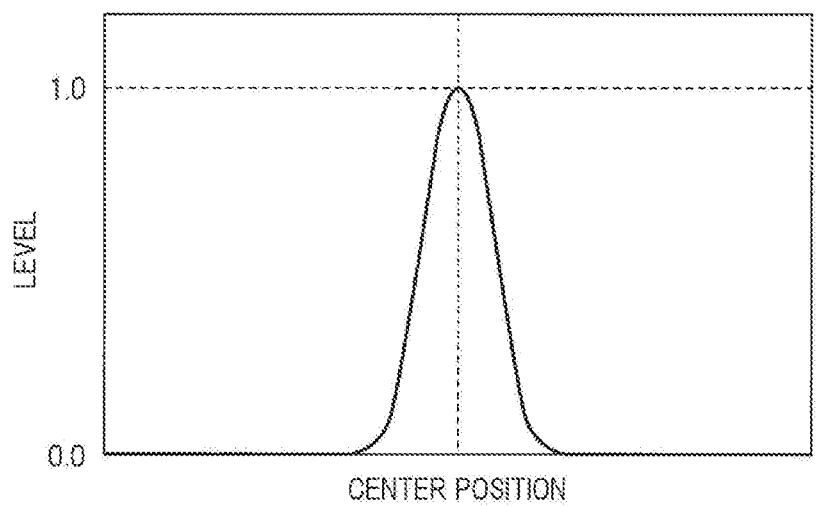
FIG. 11C is a diagram for describing a luminance distribution based on the power of cosine.

In addition, FIGS. 11A, 11B, and 11C are diagrams for describing the distributions of the ambient component, the diffusing component, and the specular component each expressed with the luminance level on a vertical axis and with a one-dimensional positional coordinates on a horizontal axis. In this manner, it can be seen that the levels of the distributions of the diffusing component and the specular component are steeped more than that of the Gaussian distribution of the ambient component.

Here, a video "Ia" by the filter of the ambient component is entirely averaged, and therefore, the video contains almost only the ambient component. In a video "Id" by the filter of the diffusing component, the specular component is averaged by the filter, and the video contains almost only the ambient component and the diffusing component. A video "Is" by the filter of the specular component is not almost averaged, and therefore, all of the ambient component, the diffusing component, and the specular component are left. This point is expressed by Expression 5.

Ambient=$I_a$, Diffuse=$I_d$=$I_a$, Specular=$I_s$ [Mathematical Expression 5]

In this point, when a reflection component by a logarithm space is obtained as similar to the MSR, Expression 6 is obtained.

$R_{Phong,i}(x,y)=W_d R_{Diffuse,i}(x,y)+W_x R_{Specular,i}(x,y)$ $R_{Specular,i}(x,y)=\log \vec{I}_{s,i}(x,y)-\log \vec{I}_{d,i}(x,y)=\log[F_s(x,y)\otimes I(x,y)]=\log[F_d(x,y)\otimes I(x,y)]$ $R_{Diffuse,i}(x,y)=\log \vec{I}_{d,i}(x,y)-\log \vec{I}_{a,i}(x,y)=\log[F_d(x,y)\otimes I(x,y)]-\log[F_a(x,y)\otimes I(x,y)]$ [Mathematical Expression 6]

In addition, the specular component of a mirror, a metal plate, and others is considered to be total reflection, and therefore, the power of cosine is infinite. At this time, for the reflection component based on the specular component, Expression 7 may be used.

$R_{Specular,i}(x,y)=\log I(x,y)=\log[F_d(x,y)\otimes I(x,y)]=\log I_i(x,y)-\log \vec{I}_{d,i}(x,y)$ [Mathematical Expression 7]

In addition, the ambient component is the average light of the entire environment, and therefore, a mean filter or an average luminance may be used instead of the Gaussian filter. For example, when the average luminance is used, Expression 8 can be obtained.

$R_{Diffuse,i}(x,y)=\log \vec{I}_{d,i}(x,y)-\log[\Sigma I(x,y)/\text{num}]=\log \vec{I}_{d,i}(x,y)=\log \vec{I}_{a,i}(x,y)$ [Mathematical Expression 8]

In addition, the specular component is highly visible at the highlight having a high luminance in many cases, and the diffusing component may be a middle or lower luminance in many cases. Accordingly, for example, a gain of a high luminance area as illustrated in FIG. 12A may be added to the specular component Rspecular of Expression 6, and a gain of a middle or lower luminance area as illustrated in FIG. 12B may be added to the diffusing component Rdiffuse.

Figure 12A:
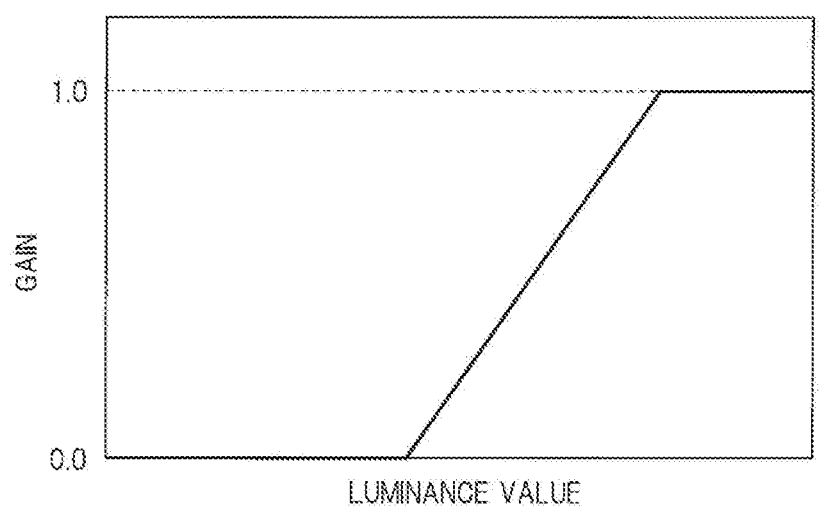
FIG. 12A is a diagram for describing a specular correction gain based on a luminance value of a video.

Here, in a case of assumption that the input/output curve of FIG. 12A is set to "g(I)", the gain becomes 0 when an input luminance "I" is a low luminance, the gain is gradually increased from a middle luminance, and the gain becomes 1 when the input luminance is a high luminance. When it is assumed that he input/output curve of FIG. 12B is set to "1−g(I)", the gain is 1 when the luminance is low, the gain is gradually decreased from the middle luminance, and the gain becomes 0 when the luminance is high.

In addition, as similar to the example of the MSR, when a gain and an exponential function are added to Expression 6 after the weighed average, a homomorphic filter can be obtained. For such a homomorphic filter, a logarithm function and an exponential function may be approximated by, for example, a function using a power method and the inverse function thereof. In this case, Expression 9 is obtained when the function is set to "f".

$$R_{Phong,i}(x,y)=W_d R_{Diffuse,i}(x,y)+W_x R_{Specular,i}(x,y)$$

$$R_{Specular,i}(x,y)=f(F_s(x,y)\otimes I(x,y))-f(F_d(x,y)\otimes I(x,y))=f(\vec{I}_{s,i}(x,y)-f(\vec{I}_{d,i}(x,y)))$$

$$R_{Diffuse,i}(x,y)=f(F_d(x,y)\otimes I(x,y))-f(F_a(x,y)\otimes I(x,y))=f(\vec{I}_{d,i}(x,y)-f(\vec{I}_{a,i}(x,y)))$$

[Mathematical Expression 9]

As described above, by using the Phong reflection model, the correction is performed in consideration of the nature of reflection.

Expression 9 will be described by using FIGS. 8 and 9.

Figure 8:
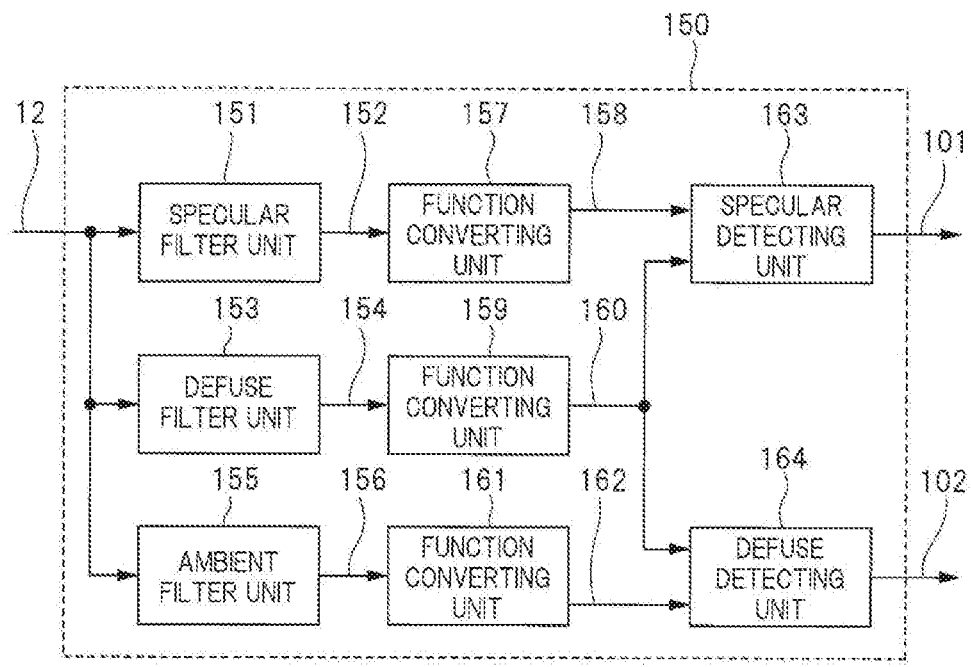
FIG. 8 is an example of a configuration of a reflected light detecting unit.

FIG. 8 is a diagram for describing a process of the reflected light detection unit according to the third embodiment. The reflected light detection unit 150 includes a specular filter unit 151, a diffusion filter unit 153, an ambient filter unit 155, function converting units 157, 159, and 161, a specular detection unit 163, and a diffusion detecting unit 164. Note that the function converting unit may perform approximation using a logarithm function or a function of a power.

Figure 9A:
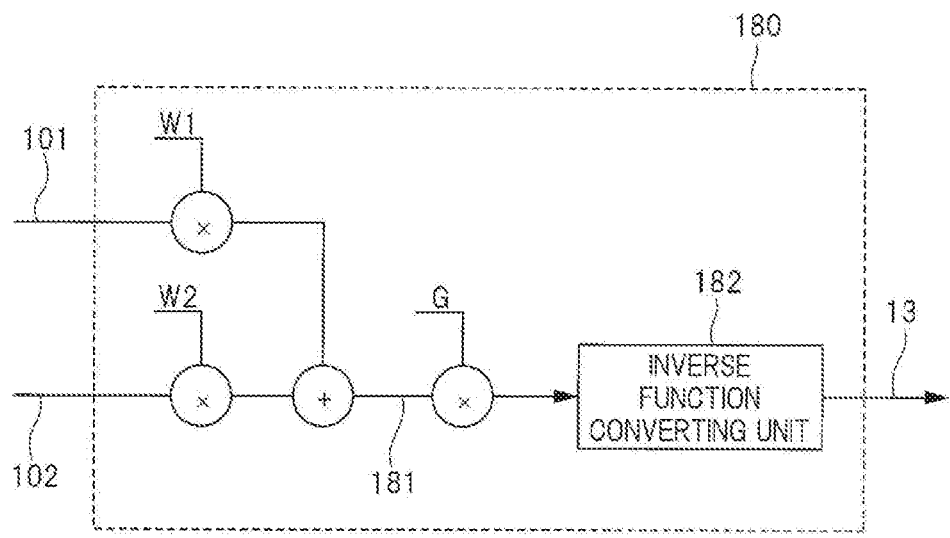
FIG. 9A is an example of a configuration of a reflected light controlling unit.
Figure 9B:
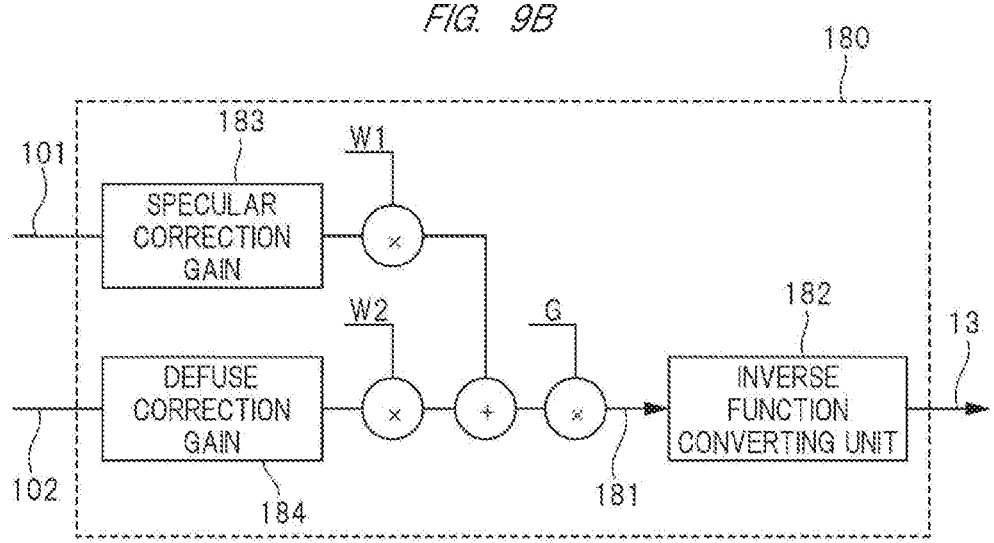
FIG. 9B is an example of a configuration of the reflected light controlling unit.

FIG. 9A is a diagram for describing a process of the reflected light control unit according to the first embodiment. The reflected light control unit 180 may be configured with the weighted average of weights W1 and W2, and may be configured with the weighted average of the weights W1 and W2, a gain G, and an inverse function converting unit 182. However, the inverse function converting unit is configured with a function inverse to the function used in the function converting unit. In addition, as illustrated in FIG. 9B, a specular correction gain 183 which has a high gain in the high luminance region of FIG. 12A and a diffusion correction gain 184 which has a high gain in the middle or lower luminance region of FIG. 12B may be added to the configuration of FIG. 9A.

According to the above configuration, when the reflected light component is extracted, the video is decomposed for each nature of reflection of the light, that is, for each of the specular component, the diffusing component, and the ambient component, and a correction amount is changed in accordance with each nature, so that the first correction video signal 21 having a high texture in consideration of the material of the object in the video can be obtained from the first Retinex processing unit 20.

Next, the second Retinex processing unit 22 is assumed to perform a video correction using the MSR model. At this time, a process having a larger scale size than that of the above-described first Retinex processing unit 20 is performed.

With such a configuration described above, the first correction video signal 21 becomes a video signal in consideration of the nature of the object, and the second correction video signal 23 becomes a video signal subjected to the contrast correction in a relatively large area of the video. These correction video signals are subjected to composition as similar to the operation of the video composing unit 26 described in the second embodiment. In this manner, since a ratio of the second correction video signal is large in a region of the low luminance level of the video, a contrast improving effect is increased. Further, since a ratio of a video correction signal in consideration of the nature of the object is large in a region of the high luminance level of the video, a video having a good visibility can be obtained over the entire region of the luminance level of the video as the correction video signal 13.

According to the third embodiment of the present invention described above, an output video having a higher texture in addition to the effect of the second embodiment described above can be obtained.

Fourth Embodiment

The first to third embodiments describe a method of performing two types of Retinex processing having different properties on an input video and composing two Retinex processing result videos in accordance with a feature of an input video to generate an output video, thereby improving the definition of the video and the visibility of the shadow portion. That is, a description has been given of a method of separating a color video into a luminance component and two types of color difference components, applying Retinex processing to the luminance component, and then recomposing the two types of color difference components to restore the color video as a method of improving the definition of the video and the visibility of the shadow portion by applying Retinex processing to a color video.

However, when Retinex processing is performed on the color video by this method, the definition of the video and the visibility of the shadow portion are improved. At the same time, in a part where the luminance component is emphasized by Retinex processing, color tends to be lighter since only the luminance component is emphasized without changing values of the color difference components, and a possibility that a color rendering property of the video may deteriorate is considered.

Therefore, the present embodiment describes that improvement in the definition of the video and the visibility of the shadow portion of the video corresponding to the effect of Retinex are more suitably attempted without degrading the color rendering property by emphasizing the color that becomes lighter through Retinex processing using saturation emphasis to solve the above-mentioned problem.

Figure 13:
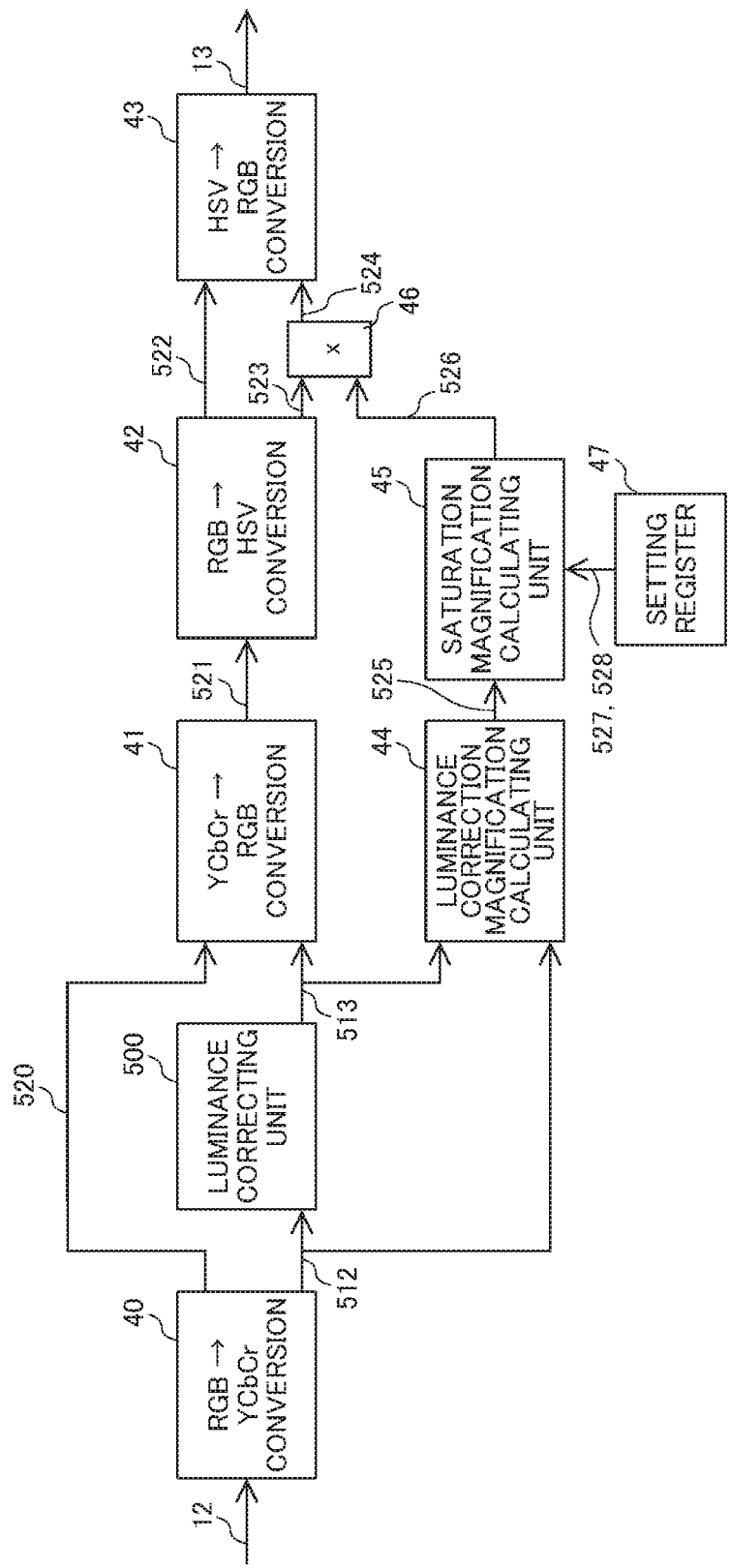
FIG. 13 is an example of a configuration of a video correcting unit according to a fourth embodiment of the present invention.

The present embodiment has a configuration in which the video correcting unit 100 of the video display device in FIG. 1 of the first embodiment is replaced with a video correcting unit illustrated in FIG. 13. That is, FIG. 13 is an example of a configuration of the video correcting unit in the present embodiment.

In FIG. 13, the input internal video signal 12 is a color video including three components of RGB and is converted into a luminance signal 512 and two types of color difference signals 520 by an RGB→YCbCr converting unit 40. Here, it is presumed that the color difference signals 520 include two types of components of Cb and Cr. However, the present invention is not limited thereto. Next, the luminance signal 512 is input to a luminance correcting unit 500. The luminance correcting unit 500 has a similar function to that of the video correcting unit 100 of FIG. 2 in the first embodiment, and thus a detailed description thereof will be omitted. A luminance signal 513 output as a correction result of the luminance correcting unit 500 and the two types of color difference signals 520 are converted into an RGB image 521 by a YCbCr→RGB converting unit 41. Here, the RGB→YCbCr converting unit 40 and the YCbCr→RGB converting unit 41 can be realized by 3×3 matrix operation. Examples of calculation formulas of the RGB→YCbCr converting unit 40 and the YCbCr→RGB converting unit 41 are shown in Mathematical Expression 10 and Mathematical Expression 11. Even though coefficients of the operation may change depending on the video format, the present invention does not depend on values of the coefficients.

$Y=0.299 \times R+0.587 \times G+0.114 \times B$ $Cb=-0.168736 \times R-0.331264 \times G+0.5 \times B$ $Cr=0.5 \times R-0.418688 \times G-0.081312 \times B$ [Mathematical Expression 10]

$R=Y+1.402 \times Cr$ $G=Y-0.344136 \times Cb-0.714136 \times Cr$ $B=Y+1.772 \times Cb$ [Mathematical Expression 11]

According to the configuration up to this point, the RGB image 521 becomes an image in which only the luminance component is corrected by the luminance correcting unit 500 without changing the color difference component with respect to the input internal video signal 12. Here, when correction processing by the luminance correcting unit 500 is processing in a direction of emphasizing the luminance, only the luminance value is emphasized without changing the color difference component, and thus the color of the video is lightened and the color rendering property may deteriorated.

For improvement therein, in the present embodiment, the color rendering property is improved using a saturation emphasizing circuit described below. Here, when saturation enhancement is uniformly performed on the RGB image 521, regardless of a degree of correction of the luminance correcting unit 500, the obtained image is unnatural since the saturation is enhanced.

Therefore, in the present embodiment, the degree of correction of the luminance correcting unit 500 is calculated by a luminance correction magnification calculating unit 44. Various methods can be considered as a method of calculating the degree of correction. In the present embodiment, as shown in Mathematical Expression 12, using luminance signals before and after the luminance correcting unit 500, a value obtained by dividing a value of the luminance signal 513 by a value of the luminance signal 512 is used as luminance correction magnification 525.

Luminance correction magnification 525=Luminance value 513 after luminance correction/Luminance value 512 before luminance correction [Mathematical Expression 12]

Here, in a case where the luminance signal 512 corresponds to 0, division may not be performed, and thus the luminance correction magnification 525 is defined as 1.

Instead of comparing the luminance signals before and after the luminance correcting unit 500, the luminance correction magnification may be calculated in the luminance correcting unit 500 and directly obtained by the luminance correction magnification calculating unit 44.

In addition, when the luminance correction magnification 525 is used as saturation correction magnification without change, saturation may be excessively emphasized in a region in which the luminance correction magnification 525 has a large value in a dark part of the video, etc. Thus, in the present embodiment, saturation correction magnification 526 is calculated by a saturation magnification calculating unit 45 without using the luminance correction magnification 525 without change. In addition, to allow the user to change a property of the saturation correction magnification 526, two types of adjustment parameters of a saturation correction ratio 527 and a saturation correction magnification upper limit 528 are prepared in a setting register 47.

Next, an example of an operation of the saturation magnification calculating unit 45 will be described using FIG. 14 and Mathematical Expression 13. Note that this operation is merely an example, and the present invention is not limited to this operation.

Figure 14:
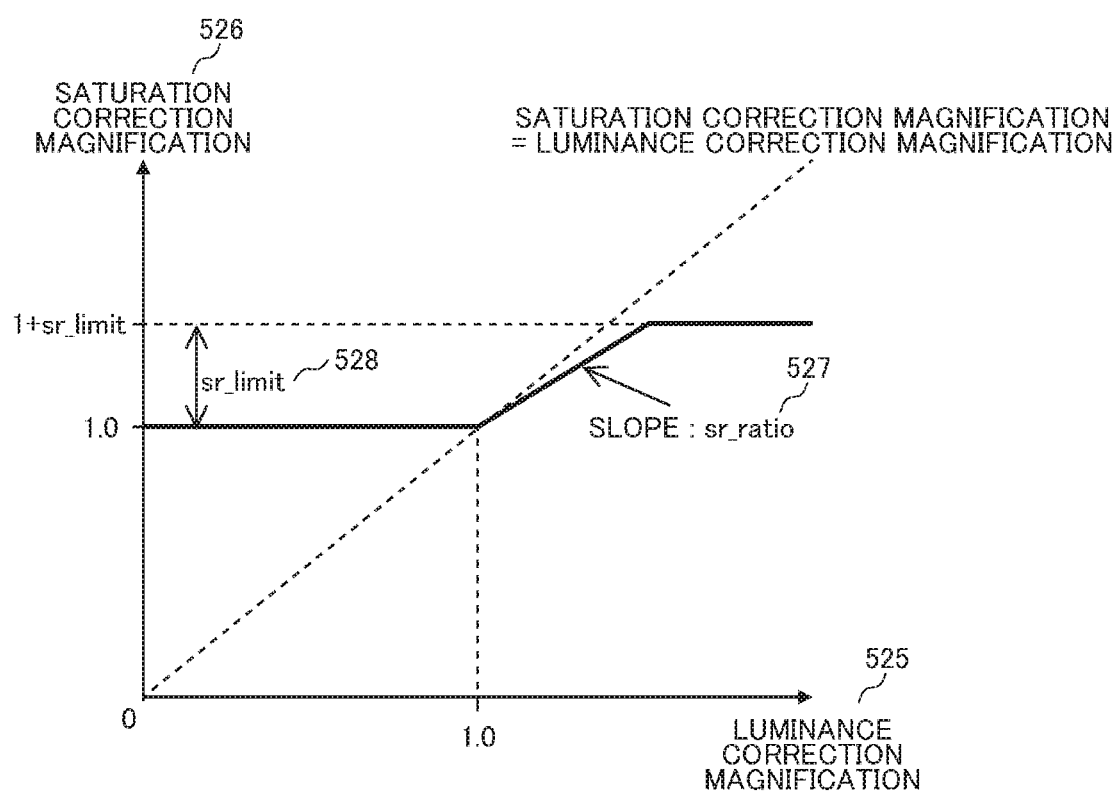
FIG. 14 is an example of a configuration of a saturation magnification calculating unit.

FIG. 14 is a graph illustrating a relationship between the luminance correction magnification 525 corresponding to an input of the saturation magnification calculating unit 45 and the saturation correction magnification 526 corresponding to an output. In the graph, a property indicated by a solid line is an input/output property of the saturation magnification calculating unit 45, and a broken line is an auxiliary line for clarity of the solid line. This input/output property is generated using Mathematical Expression 13.

Intermediate value $A$=Luminance correction magnification 525−1.0

Intermediate value $B$=MAX(intermediate value $A$, 0.0)

Intermediate value $C$=Intermediate value $B$×Saturation correction ratio 527

Intermediate value $D$=MIN(intermediate value $C$, saturation correction magnification upper limit 528)

Saturation correction magnification 526=Intermediate value $D$+1.0 [Mathematical Expression 13]

Hereinafter, a description will be given thereof.

Since the luminance correction magnification 525 is a real number of 0 or more, 1 is subtracted from the luminance correction magnification 525 to calculate an intermediate value A. The intermediate value A is compared with 0 and a larger value is set as an intermediate value B. Next, the intermediate value B is multiplied by the saturation correction ratio 527 to calculate an intermediate value C, and the obtained intermediate value C is compared with the saturation correction magnification upper limit 528 to set a smaller value as an intermediate value D. The saturation correction magnification 526 is calculated by adding 1 to the intermediate value D. This series of processing generates the property of the graph of FIG. 14. Here, the saturation correction ratio 527 is a value corresponding to a slope of an oblique portion of the graph, and is a parameter indicating a ratio of a degree at which the luminance correction magnification 525 is reflected in saturation correction. A value obtained by adding 1 to the saturation correction magnification upper limit 528 is an upper limit of the saturation correction magnification 526. In this way, it is possible to impose a limitation so that saturation is not excessively emphasized in a region in which the luminance correction magnification 525 corresponds to a large value. In addition, in this property, the saturation correction magnification 526 corresponds to a value of 1 or more at all times, and processing to weaken saturation is not performed. Note that the present invention is not limited thereto, and it is possible to perform processing to weaken the saturation.

Next, a description will be given of a method of saturation correction based on the saturation correction magnification 526 calculated as described above. In FIG. 13, first, the RGB image 521 after luminance correction is converted by an RGB→HSV converting unit 42 into a hue H, a saturation S, and a value V. An example of this conversion equation is shown in Mathematical Expression 14.

MAX 0=max(R0,G0,B0)

MIN 0=min(R0,G0,B0)

H0=

60×(G0−R0)/(MAX 0−MIN 0)+60: when B0 is smallest

60×(B0−G0)/(MAX 0−MIN 0)+180: when R0 is smallest

60×(R0−B0)/(MAX 0−MIN 0)+300: when G0 is smallest

Undefined: when R0=G0=B0

S0=

(MAX 0−MIN 0)/MAX 0: when any one of R0, G0, and B0 is a value other than 0

Undefined: when R0=G0=B0=0

V0=MAX 0  [Mathematical Expression 14]

This equation is general as an RGB→HSV conversion equation. An outline is described below. First, with regard to the respective components R0, G0, and B0 of the RGB image 521 after luminance correction, a maximum is set to MAX0 and a minimum is set to MIN0. Next, cases are classified according to a magnitude relationship between R0, G0, and B0, and a value of the hue H0 is obtained according to Mathematical Expression 14. As is clear from the definition of the equation, H0 has a value in a range of 0 to 360. When R0, G0 and B0 are all equal, MAX0−MIN0 becomes 0, and thus H0 may not be defined, which corresponds to a case in which the pixel is achromatic. For this reason, in this case, as exception processing, saturation correction is not performed in a subsequent stage. A saturation S0 and a value V0 are calculated by Mathematical Expression 14. When MAX0 is 0, division may not be performed for the saturation S0. However, MAX0 is 0 only when R0, G0 and B0 are all 0. Thus, the above-mentioned exception processing corresponding to a case in which R0, G0 and B0 are all is applied.

Saturation correction processing is performed on the saturation S0 (indicated by 523 in FIG. 13), and the hue H0 and the value V0 (both indicated by 522 in FIG. 13) calculated as described above. In saturation correction processing of this embodiment, the hue H0 and the value V0 are not corrected and are input without change to an HSV RGB converter 43 as a hue H1 and a value V1. With regard to the saturation S0, the saturation correction magnification 526 is multiplied using a multiplication circuit 46, a resultant saturation S1 (indicated by 524 in FIG. 13) is input to the HSV→RGB converter 43. When an output of the multiplication circuit 46 does not fall within a range of 0.0 to 1.0, clip processing is performed so that the output falls within the range of 0.0 to 1.0, and a result thereof is the saturation S1. The hue H1, the saturation S1 and the value V1 after saturation correction calculated in this manner are converted into RGB by the HSV→RGB converter 43 and sent to a timing controlling unit 14 as a correction video signal 13 after video correction. An example of processing of the HSV→RGB converter 43 is shown in Mathematical Expression 15.

MAX 1=V1

MIN 1=MAX 1×(1−S1)

R1=MAX 1, B1=MIN 1, G1=H1/60×(MAX 1−MIN 1)+MIN 1: when 0≤H1<60

G1=MAX 1, B1=MIN 1, R1=(120−H1)/60×(MAX 1−MIN 1)+MIN 1: when 60≤H1<120

G1=MAX 1, R1=MIN 1, B1=(H1−120)/60×(MAX 1−MIN 1)+MIN 1: when 120≤H1<180

B1=MAX 1, R1=MIN 1, G1=(240−H1)/60×(MAX 1−MIN 1)+MIN 1: when 180≤H1<240

B1=MAX 1, G1=MIN 1, R1=(H1−240)/60×(MAX 1−MIN 1)+MIN 1: when 240≤H1<300

R1=MAX 1, G1=MIN 1, B1=(360−H1)/60×(MAX 1−MIN 1)+MIN 1: when 300≤H1<360

R1=R0, G1=G0, B1=B0: when R0=G0=B0  [Mathematical Expression 15]

Since this equation is general as an HSV→RGB conversion equation, only an outline will be described. First, the value V1 is used without change as a maximum component MAX1. Next, a minimum component MIN1 is calculated from the maximum component MAX1 and the saturation S1 based on Mathematical Expression 15. Thereafter, R1, G1 and B1 are obtained according to Mathematical Expression 15 in accordance with a value of the hue H1. As described above, in the case of R0=G0=B0, no valid values are set for the hue H1, the saturation S1 and the value V1, and thus the values of R0, G0 and B0 are used as values of R1, G1, and B1 without change as exception processing.

In the present embodiment, a description has been given of a procedure in which saturation correction is performed after RGB is completely converted into HSV, and then RGB is obtained from HSV to facilitate understanding of the description. However, implementation may not be performed in this manner. Since a final hue value is not required in this processing, implementation may be performed by omitting some calculation processing such as calculation of the final hue value, etc.

As described above, the present embodiment includes the video input unit, the video correcting unit that performs video correction on a video input by the video input unit, and the video display unit that displays the video corrected by the video correcting unit. Further, the video correcting unit is configured to perform local luminance correction on the video input by the video input unit, acquire a correction intensity for each part of the local luminance correction, and perform local saturation correction based on the correction intensity.

In addition, local luminance correction in the video correcting unit is correction using Retinex correction, the gain of luminance correction is acquired as the correction intensity by comparing videos before and after correction, and an intensity of local saturation correction is changed according to the gain.

In this way, it is possible to more suitably attempt improvement in the definition of the video and the visibility of the shadow portion of the video corresponding to the effect of Retinex without degrading the color rendering property.

Fifth Embodiment

In this embodiment, in the video display device of the present invention, an example of a control method when a user sets a correction property will be described.

Figure 15:
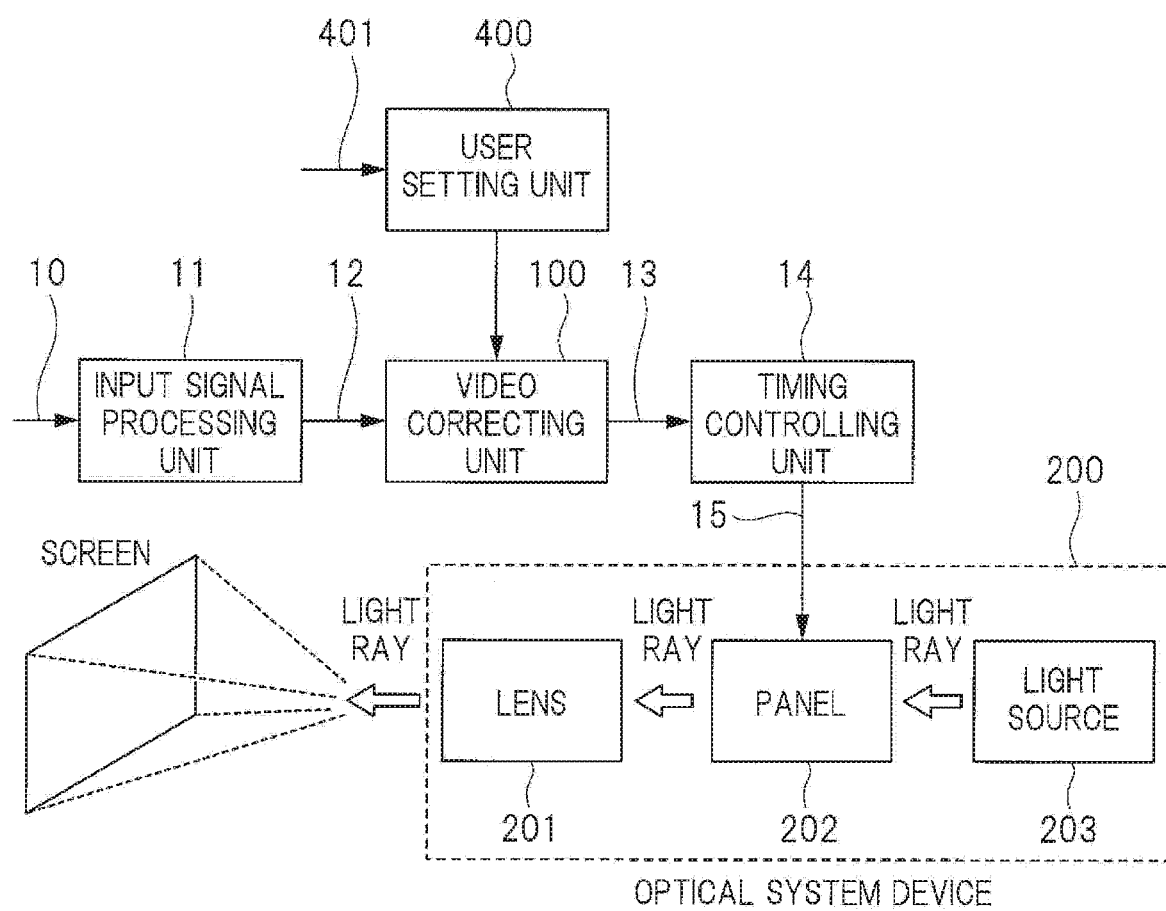
FIG. 15 is a diagram of a configuration example of a video display device according to a fifth embodiment of the present invention.

FIG. 15 illustrates an example of a configuration of a video display device in the present embodiment and is different from FIG. 1 in providing a user setting unit 400. The user setting unit 400 is configured so that the user can set whether to perform the correction and set the amount of the correction in the video processing in the video display device by receiving an operation signal 401 from the user as an input through an operation of an operation button of a remote controller or a device body and outputting an operation command signal to the video correcting unit 100 in accordance with the operation signal. In this manner, the user can perform such setting as switching the video displayed in a display unit to a user's desired state.

Figure 16:
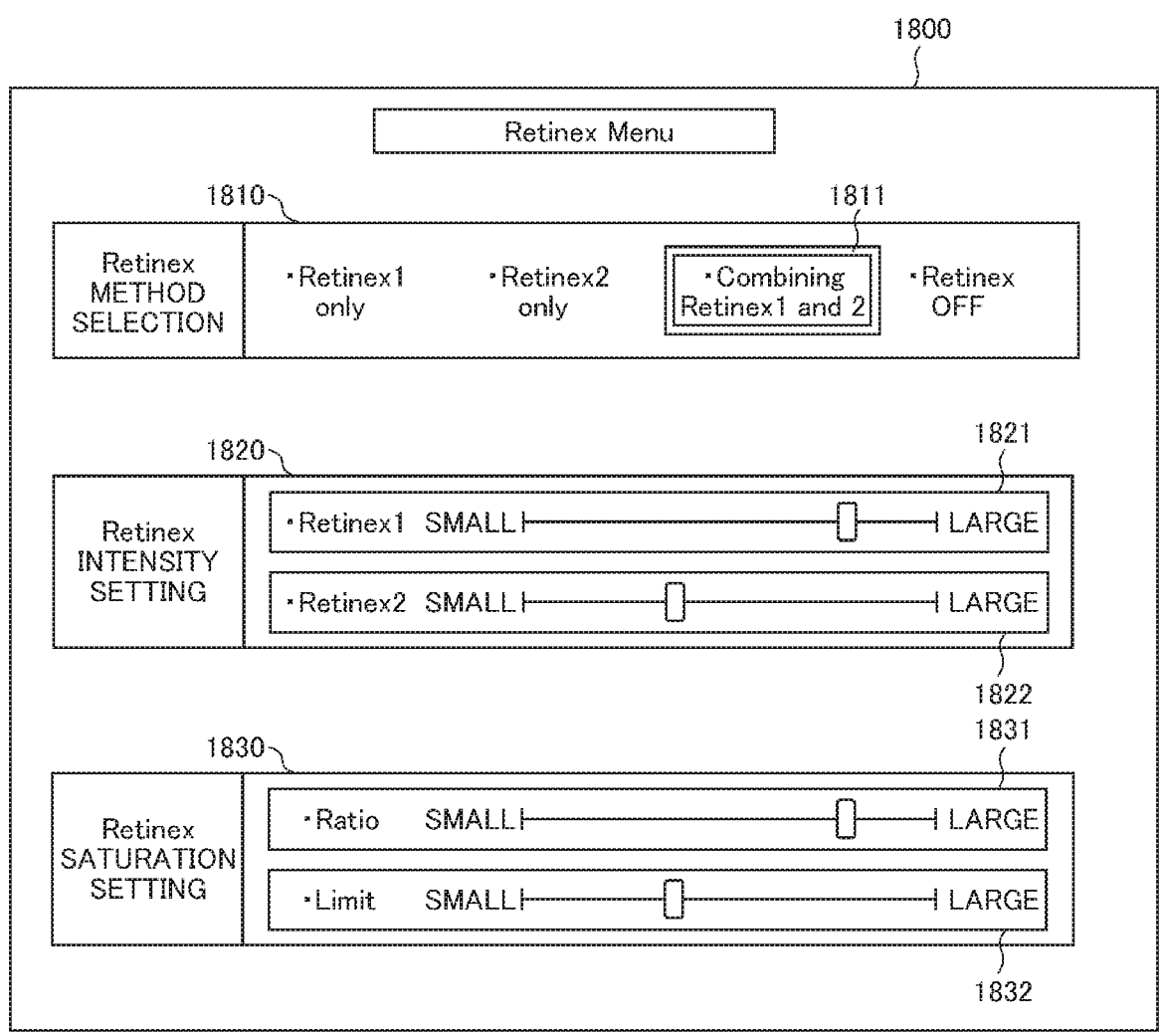
FIG. 16 is an example of a setting menu screen.

FIG. 16 illustrates an example of setting items which can be set by the user setting unit 400 in the present embodiment. FIG. 16 corresponds to a setting menu screen 1800 which the video display device displays and illustrates an example of the setting menu screen. The setting menu screen 1800 has a signal generated by a menu screen signal generating unit (whose illustration is omitted) in the video display device, and outputs the signal instead of the correction video signal 13. Alternatively, the setting menu screen 1800 has a signal obtained by convolution with the correction video signal 13, and outputs the signal.

First, the item "Retinex Method Selection" 1810 in an example of the setting menu screen 1800 will be described. With the item "Retinex Method Selection" 1810, it can be selected whether to use the Retinex processing of both of the first Retinex processing unit 20 and the second Retinex processing unit 22 described in each embodiment. The selection process is performed by moving a cursor 1811 through the operation of the operation button of the remote controller or the device body. The selected item and the process in this case will be described. For example, when an item "Retinex 1 only" is selected, only the process of the first Retinex processing unit 20 is applied to the process of the video correcting unit, and the process of the second Retinex processing unit 22 is not applied to the process of the video correcting unit. Specifically, the composition control value α may be set to 1, or the operation of the second Retinex processing unit 22 may be turned off. Next, on the contrary, when the item "Retinex 2 only" is selected, only the process of the second Retinex processing unit 22 is applied to the process of the video correcting unit, and the process of the first Retinex processing unit 20 is not applied to the video correcting unit. Specifically, the composition control value α may be set to 0, and the operation of the first Retinex processing unit 20 may be turned off. When the selection item "Combining Retinex 1 and 2" is selected, the processes of the first Retinex processing unit 20 and the process of the second Retinex processing unit 22 are composed and outputted as described above in the embodiment. When the selection item "Retinex OFF" is selected, both of the process of the first Retinex processing unit 20 and the process of the second Retinex processing unit 22 are not applied to the process of the video correcting unit. The operation of both processes may be turned off, and the video inputted to the video correcting unit may be outputted while bypassing the video correcting unit.

In the item "Retinex Method Selection" 1810 described above, it is not always required to show the above-described four selection items to the user. For example, only two selection items "Combining Retinex 1 and 2" and "Retinex OFF" may be shown. In addition, three selection items "Combining Retinex 1 and 2", "Retinex 1 only", and "Retinex OFF" may be shown. That is, at least two items among the exemplified items may be shown.

Next, the item "Retinex Intensity Setting" 1820 of the example of the setting menu screen 1800 will be descried. In the item "Retinex Intensity Setting" 1820, an intensity of each Retinex processing can be set. Specifically, the intensity of each Retinex processing is set by moving slide bars 1821 and 1822 through the operation of the operation button of the remote controller or the device body. The process in this case can be achieved by, for example, adding an offset to the gain of each Retinex processing illustrated in FIGS. 4A and 4B in accordance with the intensity. For example, a positive offset is added to the gain of FIGS. 4A and 4B when the intensity is high, and a negative offset is added when the intensity is low. Such a process of adding the offset can be achieved by inserting the process of adding the offset into the first Retinex processing unit 20 and the second Retinex processing unit 22, or inserting it to the correction video signal 21 and the correction video signal 23.

Note that the item "Retinex Intensity Setting" 1820 may be configured to switch an active state and an inactive state in accordance with the selection status of the item "Retinex Method Selection" 1810. That is, the slide bar for a process turned off in the item "Retinex Method Selection" 1810 may be the inactive state.

Next, the item "Retinex saturation Setting" 1830 of the example of the setting menu screen 1800 will be described. As described with reference to FIG. 13, the saturation magnification calculating unit 45 determines a scheme of reflecting the value of the luminance correction magnification 525 in the saturation correction magnification 526 using the values of the saturation correction ratio 527 and the saturation correction magnification upper limit 528 corresponding to the two types of parameters stored in the setting register 47. Here, by allowing the saturation correction ratio 527 to correspond to a slide bar 1831 and the saturation correction magnification upper limit 528 to correspond to a slide bar 1832, the user can adjust these values in accordance with a user's preference. In addition, in this embodiment, it is presumed that the value of the saturation correction ratio 527 is set to 0 by putting the slide bar 1831 at a leftmost position. However, it is possible to add a menu item for explicitly selecting ON/OFF.

As described above, the present embodiment sets a menu that allows the user to set local saturation correction. In this manner, the user can adjust the video correction process in each embodiment of the present invention in accordance with a user's preference, a usage purpose or a usage environment of the video display device, and a more convenient video display device can be provided.

In addition, these parameters can be changed according to a type of the input video or a state of a viewing environment acquired by an optical sensor, etc. other than a user menu. For example, a register value may be automatically changed according to the type of input video by classifying types of videos into a movie, sports, a news program, and a presentation material, determining classification to which the manually or automatically input video belongs to, and referring to a correspondence table of video classification and register setting values prepared in advance. As video classification, it is possible to consider methods such as utilization of metadata such as EPG information attached to the video and video type determination by machine learning. In addition, since brightness of a video viewing location and a color temperature of illumination can be acquired using a camera or an optical sensor, it is possible to automatically change a register set value according to the viewing environment using a similar table.

The present invention is not limited to the embodiments described above, and includes various modifications. For example, the above-described embodiments are described in detail to explain the present invention in an easy-to-understand manner, and may not include all the configurations described. In addition, a part of a configuration of a certain embodiment may be replaced with a configuration of another embodiment, and a configuration of a certain embodiment may be added to a configuration of another embodiment. In addition, with respect to a part of a configuration of each embodiment, it is possible to add, delete, and replace other configurations.

REFERENCE SIGNS LIST

10: video input signal, 12: internal video signal, 13: correction video signal, 15: display control signal, 20: first Retinex processing unit, 21: first correction video signal, 22: second Retinex processing unit, 23: second correction video signal, 24: feature analyzing unit, 25: video composing control signal, 26: video composing unit, 27, 28, 31: gain control unit, 29: video composing control signal, 30: adder, 32: illuminance level signal, 33: correction video signal of adaptive control, 40: RGB→YCbCr converting unit, 41: YCbCr→RGB converting unit, 42: RGB→HSV converting unit, 43: HSV→RGB converting unit, 44: luminance correction magnification calculating unit, 45: saturation magnification calculating unit, 46: multiplication circuit (with clip function), 47: setting register, 100: video correcting unit, 101: reflected light component based on scale 1, 102: reflected light component based on scale 2, 120: reflected light detecting unit based on MSR, 122: result of convolution product based on scale 1 filter, 124: result of convolution product based on scale 2 filter, 126: result value of SSR based on scale 1, 128: result value of SSR based on scale 2, 130: reflected light control unit based on MSR, 131: result value of weighted averaging of result of each SSR (including gain), 152: result of convolution product based on specular filter, 154: result of convolution product based on diffusing filter, 156: result of convolution product based on ambient filter, 158: result of function conversion of specular filter, 160: result of function conversion of diffusing filter, 162: result of function conversion of ambient filter, 181: result value of weighted averaging of specular component and diffusing component (including gain), 302: edge signal, 500: luminance correcting unit, 525: luminance correction magnification, 526: saturation correction magnification, 527: saturation correction ratio, 528: saturation correction magnification upper limit, 1800: setting menu screen

The invention claimed is:

1. A video display device comprising:
   a video input unit;
   a video correcting unit that performs video correction on a video input by the video input unit; and
   a video display unit that displays the video corrected by the video correcting unit, wherein the video correcting unit performs local luminance correction on the video input by the video input unit, acquires a correction intensity for each part of the local luminance correction, and performs local saturation correction based on the correction intensity;
   wherein the local luminance correction in the video correcting unit is correction using Retinex correction, gain of the local luminance correction is acquired as the correction intensity by comparing videos before and after the local luminance correction, and an intensity of the local saturation correction is changed according to the gain of the local luminance correction.

2. The video display device according to claim 1, wherein a menu that allows a user to set the local saturation correction is set.

3. The video display device according to claim 1, wherein after multiplying a magnification value corresponding to a first adjustment parameter by a value obtained by subtracting 1 from the correction intensity for each part of the local luminance correction, clip processing by an upper limit corresponding to a second adjustment parameter is performed, and the local saturation correction is performed using a value obtained by adding 1 to a result thereof as a saturation correction magnification.

4. The video display device according to claim 1, wherein the local saturation correction is performed using a saturation correction magnification calculated by performing multiplication processing using a magnification value corresponding to a first adjustment parameter and clip processing by an upper limit corresponding to a second adjustment parameter on the correction intensity for each part of the local luminance correction.

5. The video display device according to claim 3, wherein a user is allowed to adjust the magnification value corresponding to the first adjustment parameter and the upper limit corresponding to the second adjustment parameter by a menu.

6. The video display device according to claim 3, wherein means for adjusting the magnification value corresponding to the first adjustment parameter and the upper limit corresponding to the second adjustment parameter according to a type of the video input to the video input unit or a viewing environment is installed.

7. The video display device according to claim 1, wherein the local luminance correction is realized by video composition processing for performing first Retinex processing on the video input from the video input unit, performing second Retinex processing different in scheme from the first Retinex processing on the video input from the video input unit, and composing the video processed by the first Retinex processing and the video processed by the second Retinex processing according to a feature of the video input from the video input unit.

8. The video display device according to claim 7, wherein a scale in the first Retinex processing is different from a scale in the second Retinex processing.

9. The video display device according to claim 8,
   wherein the scale in the first Retinex processing is smaller than the scale in the second Retinex processing, and
   the video composition processing sets a composition ratio of the video subjected to the first Retinex processing to be larger than a composition ratio of the video subjected to the second Retinex processing when a luminance of the video input from the video input unit is relatively high, and sets the composition ratio of the video subjected to the first Retinex processing to be smaller than the composition ratio of the video subjected to the second Retinex processing when the luminance of the video input from the video input unit is relatively low.

10. The video display device according to claim 7,
wherein the first Retinex processing is processing for separating an input video into a plurality of reflected light components, adjusting each of the plurality of separated reflected light components by a weight to obtain a weighted average, and controlling a ratio of reflected light in the video, and
the second Retinex processing is Retinex processing larger in scale than the first Retinex processing.

\* \* \* \* \*